United States Patent
Sadovnikov et al.

(10) Patent No.: US 10,379,823 B1
(45) Date of Patent: Aug. 13, 2019

(54) CONVERSION OF REMOTE APPLICATION DIALOGS TO NATIVE MOBILE CONTROLS

(71) Applicant: Parallels International GmbH, Schaffhausen (CH)

(72) Inventors: Ruslan Sadovnikov, Moscow (RU); Nikolay Dobrovolskiy, Moscow (RU); Serguei M. Beloussov, Singapore (SG)

(73) Assignee: Parallels International GmbH, Schaffhausen (DE)

( * ) Notice: Subject to any disclaimer, the term of this patent is extended or adjusted under 35 U.S.C. 154(b) by 0 days.

(21) Appl. No.: 15/695,685

(22) Filed: Sep. 5, 2017

(51) Int. Cl.
  *G06F 8/38* (2018.01)
  *G06F 8/41* (2018.01)
  *G06F 8/51* (2018.01)
  *G06F 3/0488* (2013.01)

(52) U.S. Cl.
  CPC .............. *G06F 8/38* (2013.01); *G06F 3/0488* (2013.01); *G06F 8/47* (2013.01); *G06F 8/51* (2013.01)

(58) Field of Classification Search
  CPC ..... G06F 8/38; G06F 8/47; G06F 8/51; G06F 3/0488
  USPC .................................................. 717/100–161
  See application file for complete search history.

(56) References Cited

U.S. PATENT DOCUMENTS

| | | | | |
|---|---|---|---|---|
| 5,844,553 A | * | 12/1998 | Hao | G06F 9/451 715/733 |
| 7,590,744 B2 | * | 9/2009 | Richardson | H04L 67/08 709/227 |
| 8,271,675 B2 | * | 9/2012 | Oh | G06F 3/0482 709/203 |
| 8,539,039 B2 | * | 9/2013 | Sheu | G06F 9/4445 709/217 |
| 9,304,662 B2 | * | 4/2016 | Beveridge | G06F 3/0484 |
| 9,485,290 B1 | * | 11/2016 | Kolomeitsev | H04L 65/60 |
| 9,542,080 B2 | * | 1/2017 | Beveridge | G06F 3/0484 |
| 9,773,226 B2 | * | 9/2017 | Kang | G06Q 10/10 |
| 9,984,203 B2 | * | 5/2018 | Westin | G06F 19/321 |
| 2010/0106766 A1 | * | 4/2010 | Bailey | H04L 69/16 709/203 |
| 2011/0249024 A1 | | 10/2011 | Arrasvuori et al. | |
| 2011/0314093 A1 | * | 12/2011 | Sheu | G06F 9/4445 709/203 |
| 2012/0028707 A1 | | 2/2012 | Raitt et al. | |
| 2012/0206268 A1 | | 8/2012 | Morris | |
| 2013/0290857 A1 | * | 10/2013 | Beveridge | G06F 3/0484 715/740 |
| 2014/0013234 A1 | * | 1/2014 | Beveridge | G06F 3/0484 715/740 |
| 2014/0168056 A1 | | 6/2014 | Swaminathan et al. | |

(Continued)

*Primary Examiner* — Marina Lee
(74) *Attorney, Agent, or Firm* — Lowenstein Sandler LLP

(57) ABSTRACT

A processing device of a remote server identifies at least one control in an active application window and a plurality of control options associated with the at least one control. The active application window comprises a user interface in a first format generated by an application running on the remote server. The processing device generates a first metadata representation of the at least one control and of the plurality of control options and sends the first metadata representation to a mobile device communicatively coupled to the remote server. The mobile device generates a user interface in a second format based on the first metadata representation to present the control and the plurality of control options on the mobile device.

20 Claims, 7 Drawing Sheets

(56) References Cited

U.S. PATENT DOCUMENTS

| | | |
|---|---|---|
| 2014/0258880 A1 | 9/2014 | Holm et al. |
| 2015/0121193 A1* | 4/2015 | Beveridge ............ G06F 17/2247 715/234 |
| 2015/0363368 A1* | 12/2015 | Zhang ............... G06F 17/30893 715/222 |
| 2016/0148042 A1 | 5/2016 | Gonion et al. |

* cited by examiner

CONVERSION OF REMOTE APPLICATION DIALOGS TO NATIVE MOBILE CONTROLS

TECHNICAL FIELD

Embodiments of this disclosure relate generally to computer systems and, more specifically, relate to the conversion of remote application dialogs to native mobile controls.

BACKGROUND

The industry trend towards use of tablets, smartphones, and other mobile computing devices has encouraged the development of solutions that provide remote access to traditionally non-mobile computing devices such as desktop personal computers (PCs), servers, or other information systems. Operating systems on mobile devices and stationary computing systems often have widely different presentation methods for displaying a user interface. Thus, mirroring or recreating a user interface generated for display on a stationary computing system may result in a less than satisfactory user experience when viewed on a mobile computing device.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Figure 1:
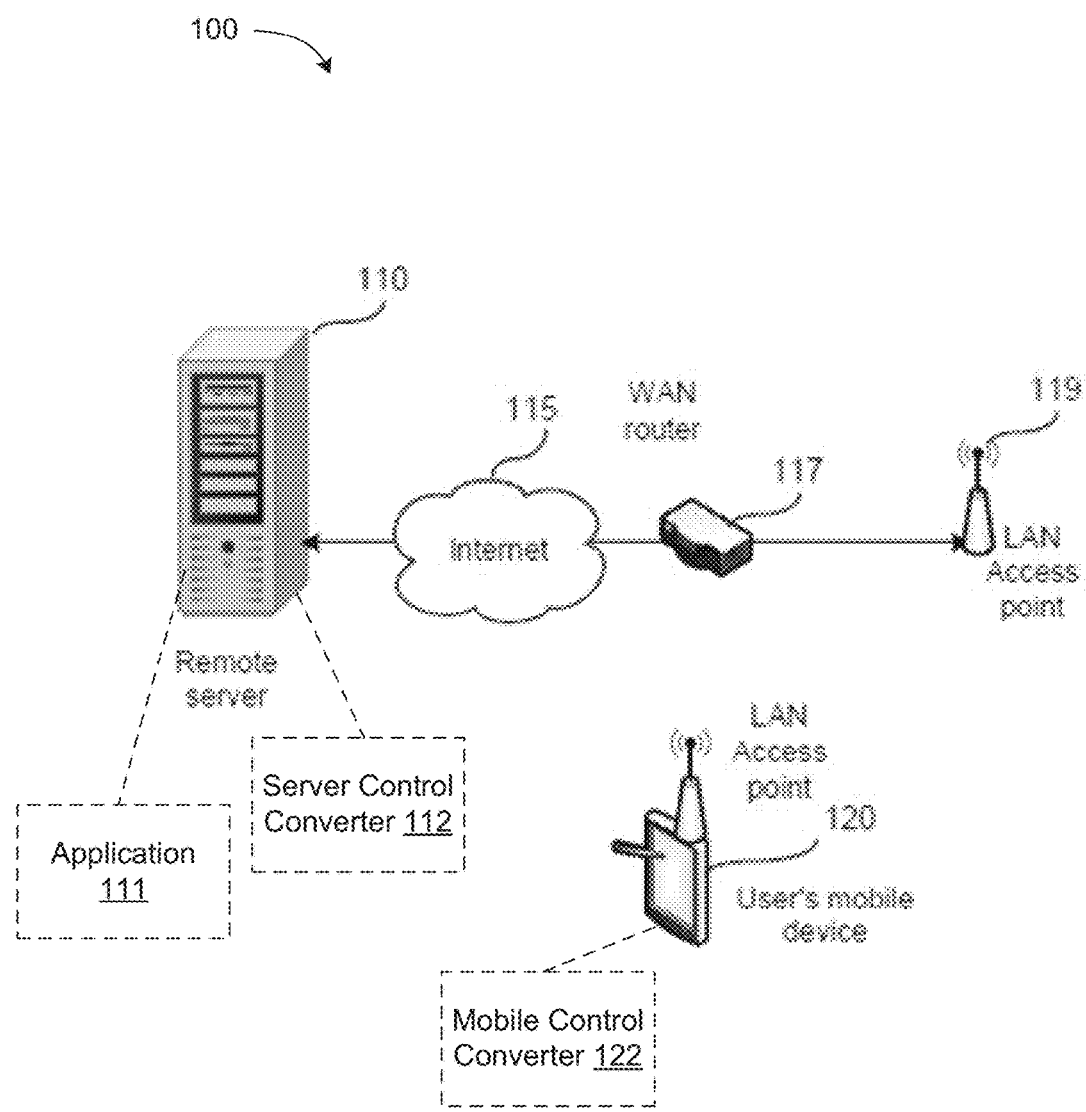
FIG. 1 is a block diagram illustrating a networked environment in which embodiments of the present disclosure may be implemented.

Described herein are methods and systems for conversion of remote application dialogs to native mobile controls. The wide spread use of tablets, smartphones, and other mobile computing devices has encouraged the development of solutions that provide remote access to traditionally non-mobile computing devices such as desktop personal computers (PCs), servers, or other information systems. One of the main problems in development and usage of such solutions is a difference in presentation methods of operating systems on mobile devices and stationary computing systems. In addition, there may be differences related to input mechanisms (e.g., a touchscreen vs a keyboard and mouse), user interface, and display size. The techniques described herein can help improve the user experience by reducing and/or eliminating the problems associated with simply mirroring or recreating windows, dialogs, helpers, panels, or notifications of a non-mobile operating system to the user interface of a mobile computing device.

In most situations, any manipulation of the user interface presented by conventional non-mobile operating systems will not allow convenient filing of data fields on a mobile device. The majority of existing solutions include delivery of the user interface "as is" to the mobile device. There have been some attempts to adjust a user-interface for use with a touch-screen on a mobile device by emulating the input methods found on stationary computer systems (e.g., by providing mouse/cursor for better precision of touch actions). In general, however, the size/ratio of a user interface generated by the stationary computing systems does not match the physical size of the display on a mobile device. This causes the image to appear either too large/small or stretched/compressed and results in an interface that is inconvenient to work with. Thus, it can be difficult to provide an adequate user experience by presenting the user interface "as is" on mobile device.

In addition, specific types of controls or control elements that are designed to be displayed on a stationary computing system are not easily adapted for other input methods (e.g., a touch screen interface). Examples of such controls can include a drop-down list, text box, a combo box (i.e., a combination of a drop-down list and a single-line editable text box), scroll bar, slider, spinner, menu bar, icon, tree view, etc.

Aspects of the present disclosure address the above and other deficiencies by providing a server control converter running on the stationary computer system that can detect the presence, location, properties and characteristics of windows, controls, dialogs, helpers, panels, or notifications in a user interface presented by the stationary computer system. For ease of explanation all of these items may be referred to as "controls" throughout the following description. The server control converter can generate a metadata representation of the controls and send the metadata representation to a mobile computing device. A mobile control converter running on the mobile device can generate a new user interface based on the information in the metadata representation according to defined interface guidelines associated with a mobile operating system running on the mobile device. Thus, a mobile-friendly user interface is provided for the user that displays properly on the mobile device and is usable via input methods available on the mobile device while still providing all of the functionality to permit interaction with the application running on the remote stationary computer system.

In one embodiment, when the user performs an input action on the mobile user interface (e.g., selecting one of a plurality of control options associated with a given control), the mobile control converter captures that input action and generates a separate metadata representation of the input action. The mobile control converter sends the metadata representation of the input action to the stationary computer system, where the server control converter converts the metadata representation of the input action to a format used by the application and executes a command corresponding to the input action in the application. Additional details of these control conversion techniques are described below with respect to FIGS. 1-7.

FIG. 1 is a block diagram illustrating a networked environment 100 in which embodiments of the present disclosure may be implemented. The networked environment 100 can include one or more remote server computer systems 110 and one or more mobile client devices 120, which can be in data communication with each other via network 115, router 117, and local area network (LAN) access point 119. Computer system 700 illustrated in FIG. 7 may be one example of any of remote servers 110 or mobile client devices 120. The network 115 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Remote server 110 may include, for example, a server computer or any other system providing computing capability. Alternatively, server 110 may employ a plurality of computing devices that may be arranged, for example, in one or more server banks or computer banks or other arrangements. Such computing devices may be positioned in a single location or may be distributed among many different geographical locations. For example, server 110 may include a plurality of computing devices that together may comprise a hosted computing resource, a grid computing resource and/or any other distributed computing arrangement. In some cases, server 110 may correspond to an elastic computing resource where the allotted capacity of processing, network, storage, or other computing-related resources may vary over time. In one embodiment, remote server may be a stationary computing system such as a desktop computer, laptop computer, server, appliance, etc.

Mobile client device 120 may include a processor-based system such as a computer system. Such a computer system may be embodied in the form of personal digital assistant, cellular telephone, smartphone, set-top box, music player, web pad, tablet computer system, game console, electronic book reader, or other device with similar capabilities. In one embodiments, mobile client device 120 may include some other type of computing system such as a desktop computer, laptop computer, workstation, etc. which may or may not be considered to be mobile. In one embodiment, mobile client device 120 may be located at a different physical location than remote server 110. In other embodiments, however, mobile client device 120 and remote server 110 may be located at the same or similar physical location. In general the proximity of remote server 110 and mobile client device 120 should not affect the operation of the control conversion techniques described herein.

In one embodiment, remote server 110 runs an application 111, such as an entertainment application, productivity application, business application, social networking application or other type of application. While the underlying functionality of application 111 is executed and performed by remote server 110, screen images and a mobile user interface may be rendered on mobile client device 120. Depending on the embodiment, a stationary user interface generated by application 111 may or may not be presented on a display device connected to remote server 110. In one embodiment, the stationary user interface may not actually be generated at all. In one embodiment, mobile client device 120 forms commands for controlling application 111, which are sent back to remote server 110 and executed on remote server 110.

In one embodiment, remote server 110 includes server control converter 112 and mobile client device 120 includes mobile control converter 122. In one embodiment, server control converter 112 running on remote server 110 can detect controls in an active window of a user interface presented by an application running on remote server 110. Server control converter 112 can generate a metadata representation of the controls, and any corresponding control options, and send the metadata representation to mobile client device 120. Mobile control converter 122 running on mobile client device 120 can generate a mobile user interface based on the information in the metadata representation and using defined interface guidelines associated with a mobile operating system running on mobile client device 120.

In one embodiment, when a user performs an input action on the mobile user interface, mobile control converter 122 captures that input action and generates a metadata representation of the input action. Mobile control converter 122 sends the metadata representation of the input action back to remote server 110, where server control converter 112 converts the metadata representation of the input action to a format used by the application running on remote server 110 and executes a command corresponding to the input action in the application.

Figure 2A:
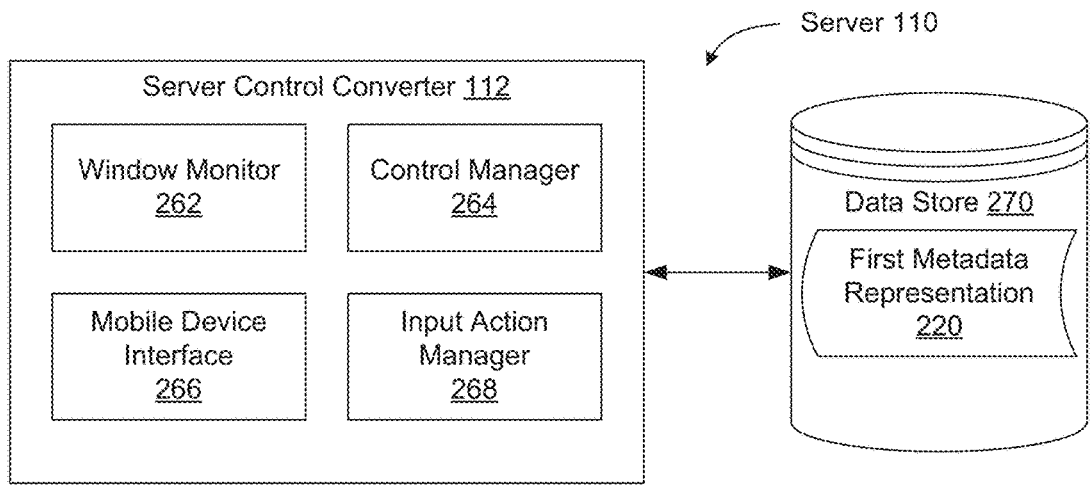
FIG. 2A is a block diagram illustrating a server control converter, according to an embodiment.

FIG. 2A is a block diagram of one embodiment of a server control converter 112 showing logical modules that may be loaded into and executed by a processing device of server 110. In some implementations, server control converter 112 can include window monitor 262, control manager 264, mobile device interface 266, and input action manager 268. This arrangement of modules and components may be a logical separation, and in other embodiments, these modules or other components can be combined together or separated in further components. In some implementations, the components of server control converter 112 may be included on a single server (e.g., server 110 of FIG. 1). Alternatively, the components of server control converter 112 may be divided across multiple servers. In one embodiment, data store 270 is connected to server control converter 112 and includes first metadata representation 220. Data store 270 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. In one embodiment, server 110 may include both server control converter 112 and data store 270. In another embodiment, data store 270 may be external to server 110 and may be connected to server 110 over a network or other connection. In other embodiments, server control converter 112 may include different and/or additional components which are not shown to simplify the description.

In one embodiment, window monitor 262 controls the appearance, closing, activating, deactivating, sizing etc. for windows presented by an operating system running on remote server 110 or by an application running on remote server 110, such as application 111. In one embodiment, window monitor 262 detects an active application window generated by application 111. The active application window may be a window, dialog box, notification, etc. with which the user is currently interacting or viewing, has most recently interacted or viewed, or that has otherwise been selected by the user. In one embodiment, the active application window may be one of multiple application windows currently open on remote server 110. Window monitor 262 can manage all of those multiple application windows and can track which single one of those windows is currently designated as the active application window. In one embodiment, window monitor 262 notifies control manager 264 of which window is currently the active application window and/or notifies control manager 264 when a different window is selected as a new active application window.

In one embodiment, in response to receiving notification of the active application window from window monitor 262, control manager 264 initiates the control conversion process. In one embodiment, control manager 264 identifies the controls, and the various control options associated with each control, present in the active application window. In one embodiment, control manager 264 can disassemble the windows, dialogs, and other controls of an application written using development tools such as XCode, Objective-C, or Swift, to their constituent controls (e.g., XCode>Debug>Attach to Process>Debug View Hierarchy). In one embodiment, control manager 264 utilizes machine learning to identify the controls of the application. For example, control manager 264 can define a set of rectangles/ovals and their correlations/locations on a display screen. Correlation of the location of images (i.e., pixels in relation to each other) can be used to identify the corresponding controls. In another embodiment, control manager 264 examines pixel mapping data for a stationary user interface generated by application 111. The pixel mapping data may provide an indication of whether each pixel is mapped to a user input control. A user input control may be any display element configured to receive user input such as, for example, a drop-down list, text box, a combo box (i.e., a combination of a drop-down list and a single-line editable text box), scroll bar, slider, spinner, menu bar, icon, tree view, etc. Upon examining each pixel to determine whether or not it is mapped to a corresponding control element, control manager 264 can identify a list of unique or separate controls in the active application window. For each identified control, control manager 264 can further identify the corresponding control options. The control options may include the various user-selectable inputs associated with each control. For example, if the control itself includes a drop-down list, the control options may include each of the selectable items that appear in the drop-down list when selected. In one embodiment, control manager 264 examines the source code for application 111 to identify the various control options associated with each control.

After identifying all of the controls in the active application window, in one embodiment, control manager 264 generates a first metadata representation 220 of the controls and the control options and stores the first metadata representation 220 in data store 270. In one embodiment, the first metadata representation 220 comprises a tree structure representing a relationship between a plurality of controls and control options in the active application window. The tree structure comprises a hierarchical description of the controls and control options that can be easily converted to corresponding mobile-friendly controls on mobile client device 120. The tree structure describes the layout and order of the location of controls and the corresponding rendering parameters. Each type of control element can be described by a fixed set of parameters. Depending on the operating system running on remote server 110, the format of the tree structure may vary. For example, when the operating system is macOS®, the first metadata representation 220 can be built using the Xcode Debug View Hierarchy from Apple Inc. of Cupertino, Calif. In other embodiments, the tree structure can be formed using Extensible Markup Language (XML) or some other standard language.

The metadata representation 220 may vary depending on the type of controls represented. For example, for a control section including one or more checkboxes, a text field and a combobox, one example of the metadata representation 220 may be as follows:

```
<section name="general section 1" id="8bC-Xf-vdA">
<checkbox title="Show status in menu bar" state="on" id="1bC-Xf-vdA"/>
<checkbox title="Open conversation in new window when I double-click it in the sidebar" state="off" id="2bC-Xf-vdA"/>
<textfield title="Move read conversations to History after:" placeholder=" " alignment="Natural" id="3bC-Xf-vdA" dependsOn="4bC-Xf-vdA"/>
<combobox value="8gC-Xf-vdA" type="PopUp" arrow="Bottom" menuEdge="Bottom" textDirection="Natural" layout="LeftToRight" id="4bC-Xf-vdA"/>
<values>
<value title="12 hours"/id="8gC-Xf-vdA">
<value title="One day"/id="8fC-Xf-vdA">
<value title="One week"/id="8dC-Xf-vdA">
</values>
</combobox>
</section>
<section name="general section 2" id="8bC-Xf-vdB">
```

Depending on the operating system, the settings dialogs may all be unified, and thus easily determined. For example, on iOS as well as on Android, the settings may be represented by NavigationController, that is by a controller, in which TableControlers can be included. In the most cases it is sufficient for control manager 264 to have knowledge about sections, types of controls (e.g., checkbox, text-field, etc.), order and set of values available for selection. Information about the indentation or a specific graphics context may not be necessary.

In one embodiment, mobile device interface 266 facilitates communication with mobile client device 120. Mobile device interface 266 can utilize any number of different communication standards including, for example, transmission control protocol/internet protocol (TCP/IP), hypertext transfer protocol (HTTP), etc. In one embodiment, mobile device interface 266 sends the first metadata representation 220 to mobile client device 120 over a network using various network components, including, for example, network 115, WAN router 117 and LAN access point 119.

Mobile device interface 266 can further receive information from mobile client device 120. For example, in one embodiment, mobile device interface 266 may receive a command issued by mobile client device 120 requesting a launch of application 111 on remote server 110. In addition, mobile device interface 266 may receive a second metadata representation 222 of an input action from mobile client device 120. As will be described further below, the input action may include a selection of one of the plurality of control options for a particular control.

In one embodiment, input action manager 268 converts the second metadata representation 222 to the first format used by application 111 running on remote server 110. In response, application 111 can execute a command corresponding to the input action. In one embodiment, according to second metadata representation 222, input action manager 268 may select one of the control options for a given control, insert a value into an input field, etc. Depending on the embodiment, input action manager 268 can adapt, substitute, make selection of data or otherwise convert the information in second metadata representation 222 for controls in the first format used by application 111 on remote server 110. Using the example in Paragraph 27 above, the combobox has id="4bC-Xf-vdA"—a unique id within the dialogue and the current setting "12 hours" with unique id="8gC-Xf-vdA". In fact, the selection of one or another setting causes the initialization of a function which sends the ID of the control and the ID of the selected setting to server control converter 112. In this example, the user has chosen the new setting of control id="4bC-Xf-vdA", new setting id="8fC-Xf-vdA" ("One day"). This can be converted as follows:
<combobox value="8gC-Xf-vdA" type="PopUp" arrow="Bottom" menuEdge="Bottom" textDirection="Natural" layout="LeftToRight" id="4bC-Xf-vdA"/>
<values>
<value title="12 hours"/id="8gC-Xf-vdA">
<value title="One day"/id="8fC-Xf-vdA">

Figure 2B:
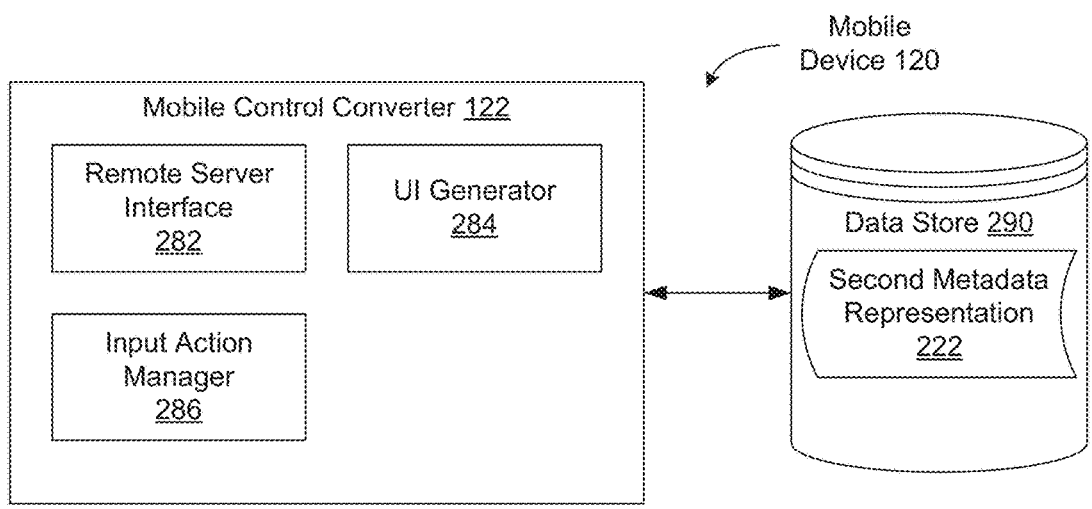
FIG. 2B is a block diagram illustrating a mobile control converter, according to an embodiment.

FIG. 2B is a block diagram of one embodiment of a mobile control converter 122 showing logical modules that may be loaded into and executed by a processing device of mobile device 120. In some implementations, mobile control converter 122 can include remote server interface 282, user interface (UI) generator 284 and input action manager 286. This arrangement of modules and components may be a logical separation, and in other embodiments, these modules or other components can be combined together or separated in further components. In some implementations, the components of mobile control converter 122 may be included on a single mobile device (e.g., mobile client device 120 of FIG. 1). Alternatively, the components of mobile control converter 122 may be divided across multiple servers. In one embodiment, data store 290 is connected to mobile control converter 122 and includes second metadata representation 222. Data store 290 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. In one embodiment, mobile device 120 may include both mobile control converter 122 and data store 290. In another embodiment, data store 290 may be external to mobile device 120 and may be connected to mobile device 120 over a network or other connection. In other embodiments, mobile control converter 122 may include different and/or additional components which are not shown to simplify the description.

In one embodiment, remote server interface 282 facilitates communication with remote server 110. Remote server interface 282 can utilize any number of different communication standards including, for example, transmission control protocol/internet protocol (TCP/IP), hypertext transfer protocol (HTTP), etc. In one embodiment, remote server interface 282 receives the first metadata representation 220 from remote server 110 over a network using various network components, including for example, network 115, WAN router 117 and LAN access point 119.

Remote server interface 282 can further send information to remote server 110. For example, in one embodiment, remote server interface 282 may send a command requesting a launch of application 111 on remote server 110. In addition, remote server interface 282 may send a second metadata representation 222 of an input action to remote server 110. In one embodiment, the input action includes a selection of one of the plurality of control options for a particular control.

In one embodiment, UI generator 284 generates a user interface in a second format based on the received first metadata representation 220 to present the controls and control options on mobile client device 120. In one embodiment, UI generator 284 generates the user interface in the second format according to interface guidelines associated with a mobile operating system running on mobile client device 120. For example, if mobile client device 120 runs a mobile operating system such as iOS or Android™, there may be defined interface guidelines for how a user interface should be rendered. For example, the iOS human interface guidelines specify design principles which UI generator 284 may follow when generating the user interface in the second format. UI generator 284 can determine the functionality, characteristics and parameters of a given control from first metadata representation 220 and recreate that control in a mobile interface. The control in the mobile interface may offer the same functionality (e.g., be able to receive the same user input) as the original control, but may be presented according to the interface guidelines for mobile client device 120.

In one embodiment, input action manager 286 captures an indication of an input action corresponding to an interaction with the mobile UI. The input action may include, for example, a selection of one of a plurality of control options associated with a control rendered in the mobile UI. In one embodiment, input action manager 286 generates a second metadata representation 222 of the input action and stores the second metadata representation 222 in data store 290. Second metadata representation 222 may include information that represents the user input action in a generic form that can be easily converted back to corresponding controls in the stationary format on remote server 110.

Figure 3:
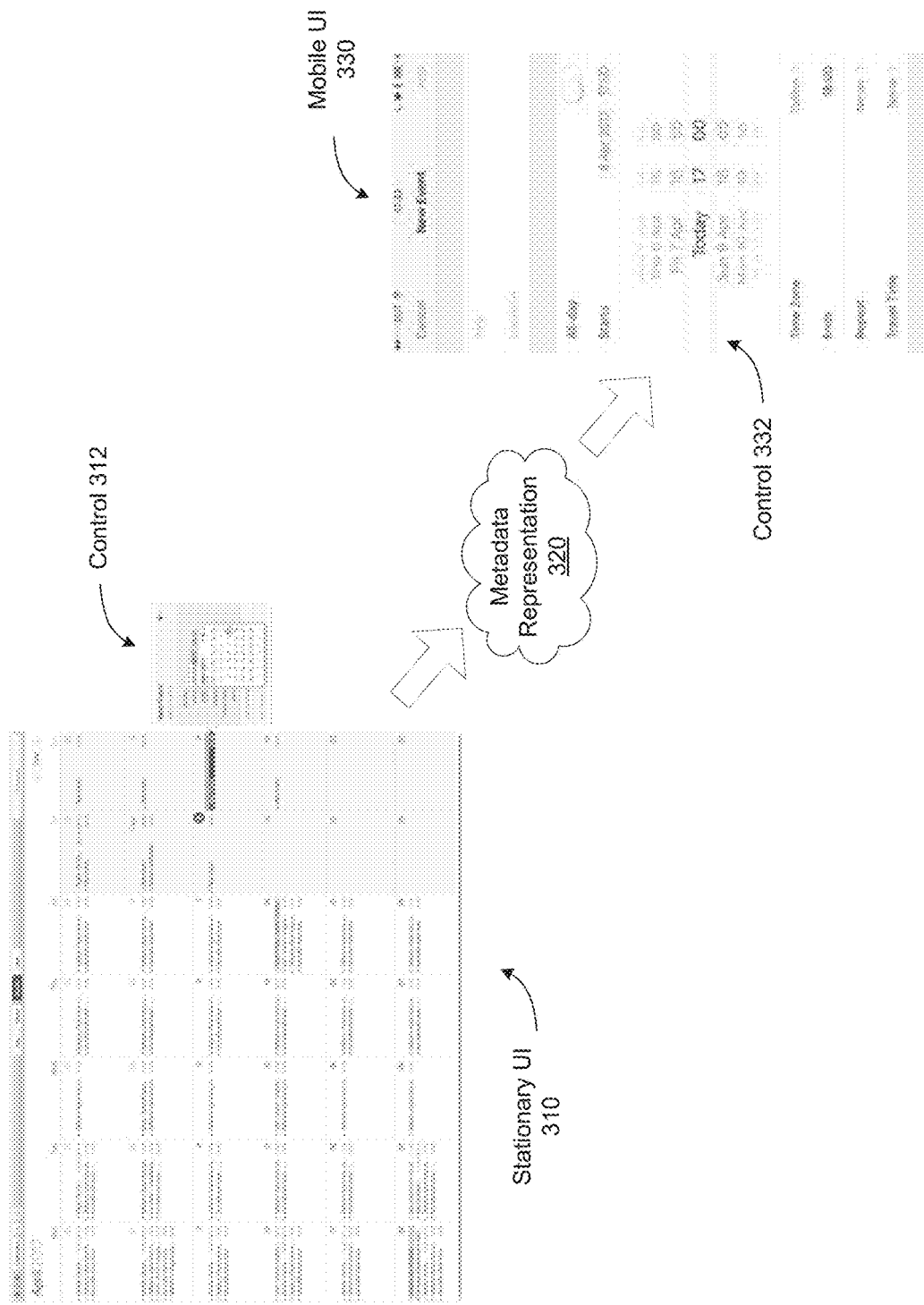
FIG. 3 is a diagram illustrating conversion of controls between a stationary user interface and a mobile user interface, according to an embodiment.

FIG. 3 is a diagram illustrating conversion of controls between a stationary user interface and a mobile user interface, according to an embodiment. In one embodiment, application 111 running on remote server 110 generates a stationary user interface (UI) 310. Stationary UI 310 may have a first format compatible with the display size and user input devices associated with remote server 110. For example, stationary UI 310 may be designed for display on a light emitting diode (LED) computer monitor and configured to work with input devices including a keyboard and a computer mouse. In one embodiment, stationary UI 310 includes control 312. In an example where application 111 is a calendar application and stationary UI 310 includes an image of a calendar, control 312 may include a dialog box for adding an event to the calendar. Control 312 may be designed to receive user input via a keyboard and/or computer mouse to enable adding the event to the calendar. The first format of control 312, however, may not be compatible with a user interface presented on mobile client device 120. A different screen size and different input devices may prevent a user from being able to properly view and interact with control 312 if it were to be presented in the same format on mobile client device 120.

In one embodiment, server control converter 112 running on remote server 110 can detect control 312 in an active window of stationary UI 310. As described above, server control converter 112 can generate a metadata representation 320 of the controls, and any corresponding control options, and send the metadata representation 320 to mobile client device 120. Mobile control converter 122 running on mobile client device 120 can generate a mobile UI 330 based on the information in the metadata representation 320 and using defined interface guidelines associated with a mobile operating system running on mobile client device 120.

Mobile UI 330 may have a second format compatible with the display size and user input devices associated with mobile client device 120. For example, mobile UI 330 may be designed for display on AMOLED capacitive touchscreen display of a smartphone or table computer. In one embodiment, mobile UI 330 includes control 332 which corresponds to control 312 of stationary UI 310. In one embodiment, control 332 may also include a dialog box for adding an event to the calendar, but control 332 may designed to receive user input via a touchscreen to enable adding the event to the calendar. Control 332 may be sized to properly display on the touchscreen of mobile client device 120, and the input fields (e.g., date, start time, end time, etc.) may be arranged for easier selection by touch of a user's finger, rather than selection with a cursor. In one embodiment, the size and arrangement of control 332 may be defined by interface guidelines associated with a mobile operating system of mobile client device 120. In one embodiment, control 332 may provide the same functionality and offer the ability to receive the same user input as control 312, but may be presented in a format specific to the particular application 111 and/or to the mobile client device 120.

Figure 4:
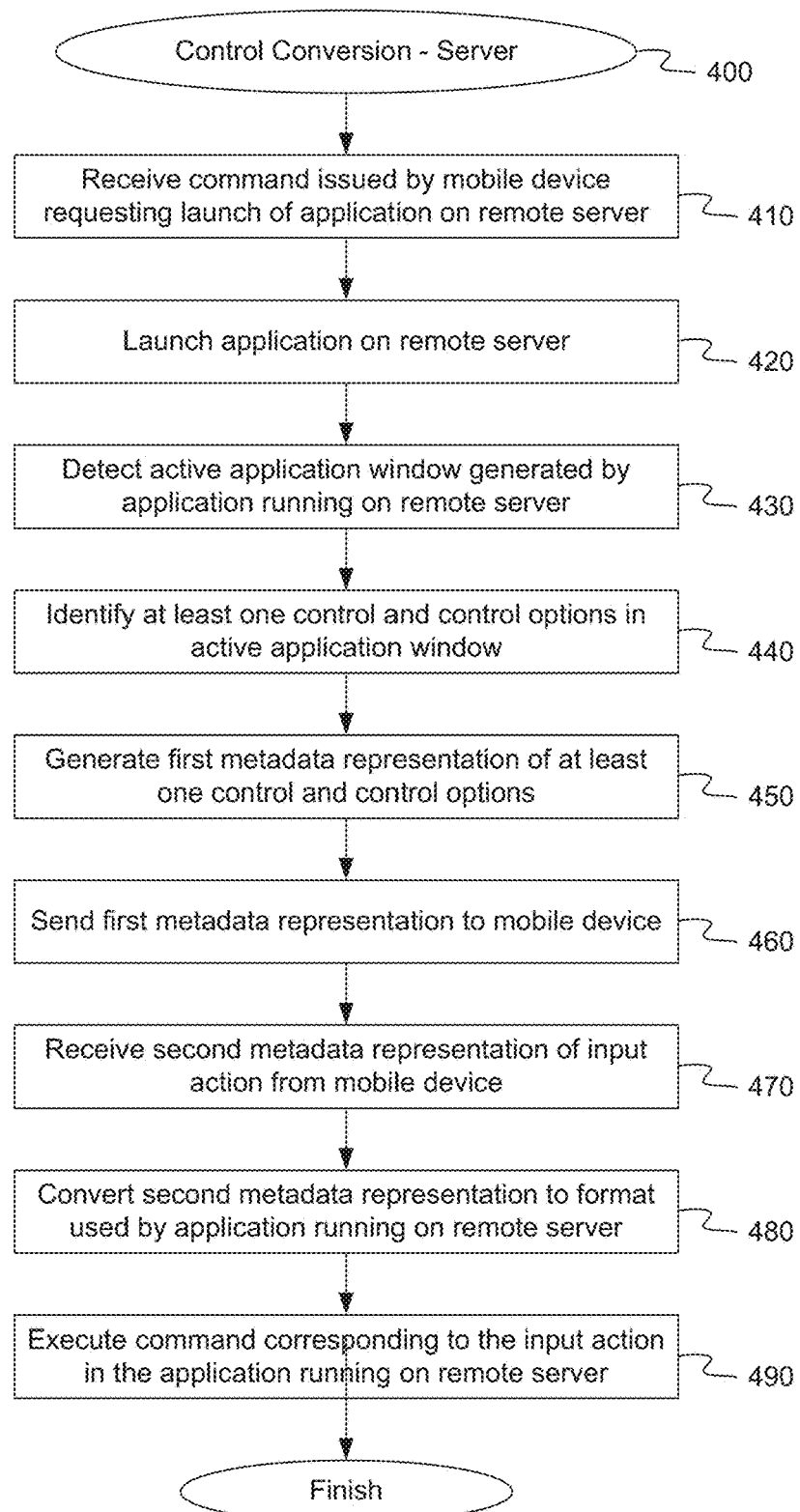
FIG. 4 is a flow diagram illustrating a server-side method of conversion of remote application dialogs to native mobile controls, according to an embodiment.

FIG. 4 is a flow diagram illustrating a server-side method of conversion of remote application dialogs to native mobile controls. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to detect controls in an active window of stationary UI 310, generate a metadata representation 320 of the controls, and send the metadata representation 320 to mobile client device 120 for presentation of the controls in a format specific to the mobile client device 120. In one embodiment, method 400 may be performed by remote server 110, as shown in FIGS. 1 and 2A.

For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Referring to FIG. 4, at block 410, method 400 receives a command issued by mobile device 120, the command requesting a launch of an application on remote server 110. In one embodiment, mobile device interface 266 may receive a command issued by mobile client device 120 requesting a launch of application 111 on remote server 110. Application 111 may include, for example, an entertainment application, productivity application, business application, social networking application or other type of application. While the underlying functionality of application 111 is executed and performed by remote server 110, screen images and a mobile user interface may be rendered on mobile client device 120. At block 420, method 400 launches the application on remote server 110.

At block 430, method 400 detects an active application window generated by the application running on remote server 110. In one embodiment, window monitor 262 detects an active application window generated by application 111. The active application window may be a window, dialog box, notification, etc. with which the user is currently interacting or viewing, has most recently interacted or viewed, or that has otherwise been selected by the user. In one embodiment, the active application window may be one of multiple application windows currently open on remote server 110.

At block 440, method 400 identifies at least one control in the active application window and a plurality of control options associated with the at least one control, wherein the active application window comprises a user interface in a first format generated by the application running on the remote server 110. In one embodiment, control manager 264 can identify a number of unique or separate controls in the active application window. For each identified control, control manager 264 can further identify the corresponding control options, which may include the various user-selectable inputs associated with each control.

At block 450, method 400 generates a first metadata representation of the at least one control and of the plurality of control options. In one embodiment, control manager 264 generates a first metadata representation 220 of the controls and the control options. In one embodiment, the first metadata representation 220 comprises a tree structure representing a relationship between a plurality of controls and control options in the active application window. The tree structure comprises a hierarchical description of the controls and control options that can be easily converted to corresponding mobile-friendly controls on mobile client device 120.

At block 460, method 400 sends the first metadata representation to mobile device 120 communicatively coupled to remote server 110, the mobile device 120 to generate a user interface in a second format based on the first metadata representation to present the control and the plurality of control options on the mobile device 120. In one embodiment, mobile device interface 266 sends the first metadata representation 220 to mobile client device 120 over a network 115.

At block 470, method 400 receives a second metadata representation of an input action from mobile device 120. In one embodiment, mobile device interface 266 may receive second metadata representation 222 of an input action from mobile client device 120. The input action may include a selection of one of the plurality of control options associated with a given control.

At block 480, method 400 converts the second metadata representation to the first format used by the application running on the remote server 110. In one embodiment, input action manager 268 converts the second metadata representation 222 to the first format used by application 111 running on remote server 110. At block 490, method 400 executes a command corresponding to the input action in the application running on the remote server 110.

Figure 5:
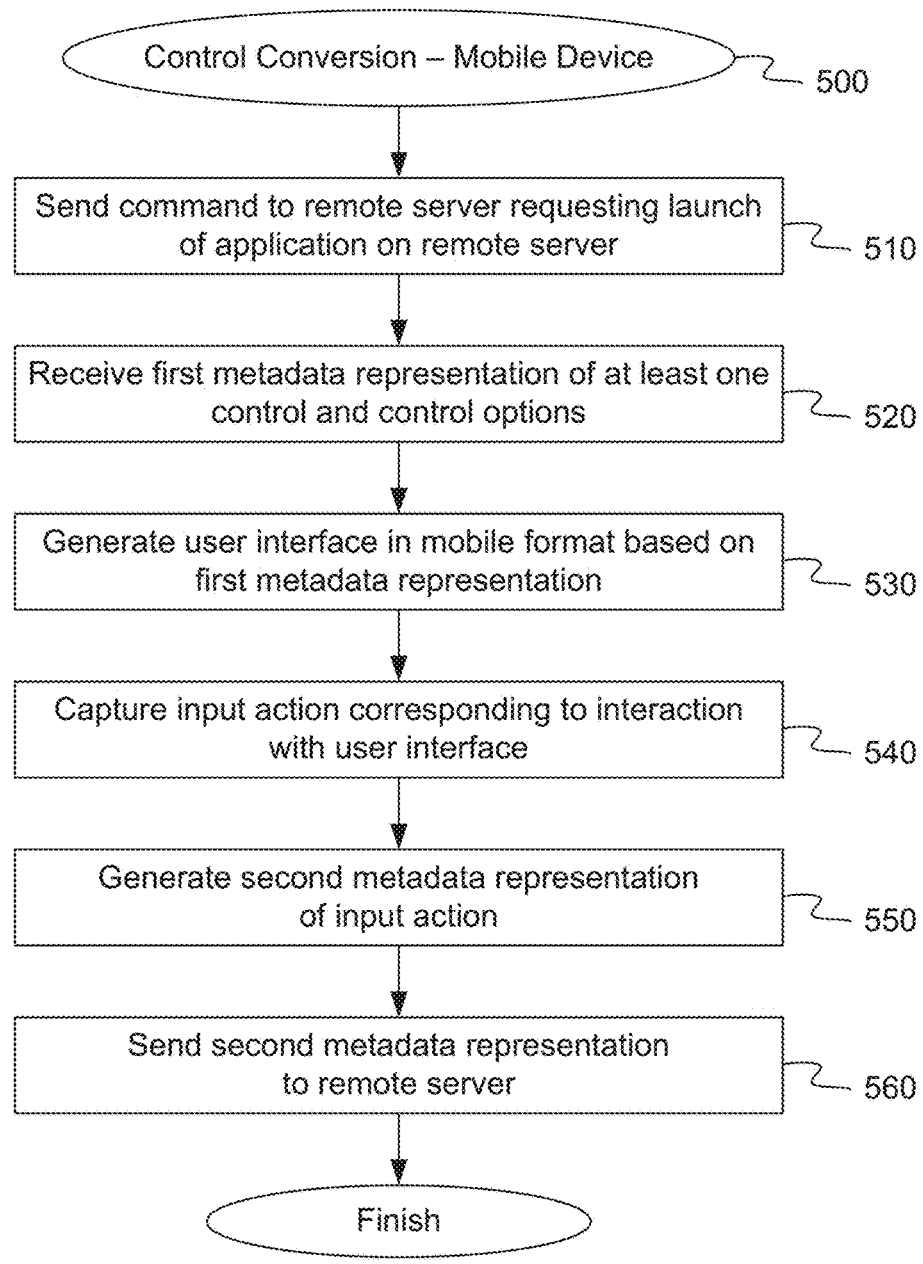
FIG. 5 is a flow diagram illustrating a mobile device-side method of conversion of remote application dialogs to native mobile controls, according to an embodiment.

FIG. 5 is a flow diagram illustrating a mobile device-side method of conversion of remote application dialogs to native mobile controls. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to receive the metadata representation 320 and generate a mobile UI 330 based on the information in the metadata representation 320 and using defined interface guidelines associated with a mobile operating system running on mobile client device 120. In one embodiment, method 500 may be performed by mobile client device 120, as shown in FIGS. 1 and 2B.

For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Referring to FIG. 5, at block 510, method 500 sends a command to remote server 110, the command requesting a launch of an application on remote server 110. In one embodiment, remote server interface 282 may send a command requesting a launch of application 111 on remote server 110. Remote server interface 282 can utilize any number of different communication standards including, for example, transmission control protocol/internet protocol (TCP/IP), hypertext transfer protocol (HTTP), etc.

At block 520, method 500 receives, from remote server 110 communicatively coupled to mobile device 120, a first metadata representation of at least one control in an active application window and of a plurality of control options associated with the at least one control, wherein the active application window comprises a user interface in a first format generated by an application running on remote server 110. In one embodiment, remote server interface 282 receives the first metadata representation 220 from remote server 110 over a network 115.

At block 530, method 500 generates a user interface in a second format based on the first metadata representation to present the control and the plurality of control options on mobile device 120. In one embodiment, UI generator 284 generates a user interface in a second format based on the received first metadata representation 220 to present the controls and control options on mobile client device 120. In one embodiment, UI generator 284 generates the user interface in the second format according to interface guidelines associated with a mobile operating system running on mobile client device 120. In one embodiment, the user interface visually is built visually, by arranging the controls in a window in editor interface, such as Interface Builder in Xcode. In another embodiment, UI generator 284 builds the user interface by describing the rules by which these controls are located in the same window.

At block 540, method 500 causes display of the user interface in the second format on mobile device 120 and captures an input action corresponding to an interaction with the user interface. In one embodiment, input action manager 286 captures the indication of the input action. The input action may include, for example, a selection of one of a plurality of control options associated with a control rendered in the mobile UI.

At block 550, method 500 generates a second metadata representation of the input action. In one embodiment, input action manager 286 generates a second metadata representation 222 of the input action. Second metadata representation 222 may include information that represents the user input action in a generic form that can be easily converted to back to corresponding controls in the stationary format on remote server 110.

At block 560, method 500 sends the second metadata representation to remote server 110. In one embodiment, remote server interface 282 sends second metadata representation 222 of an input action to remote server 110.

Figure 6:
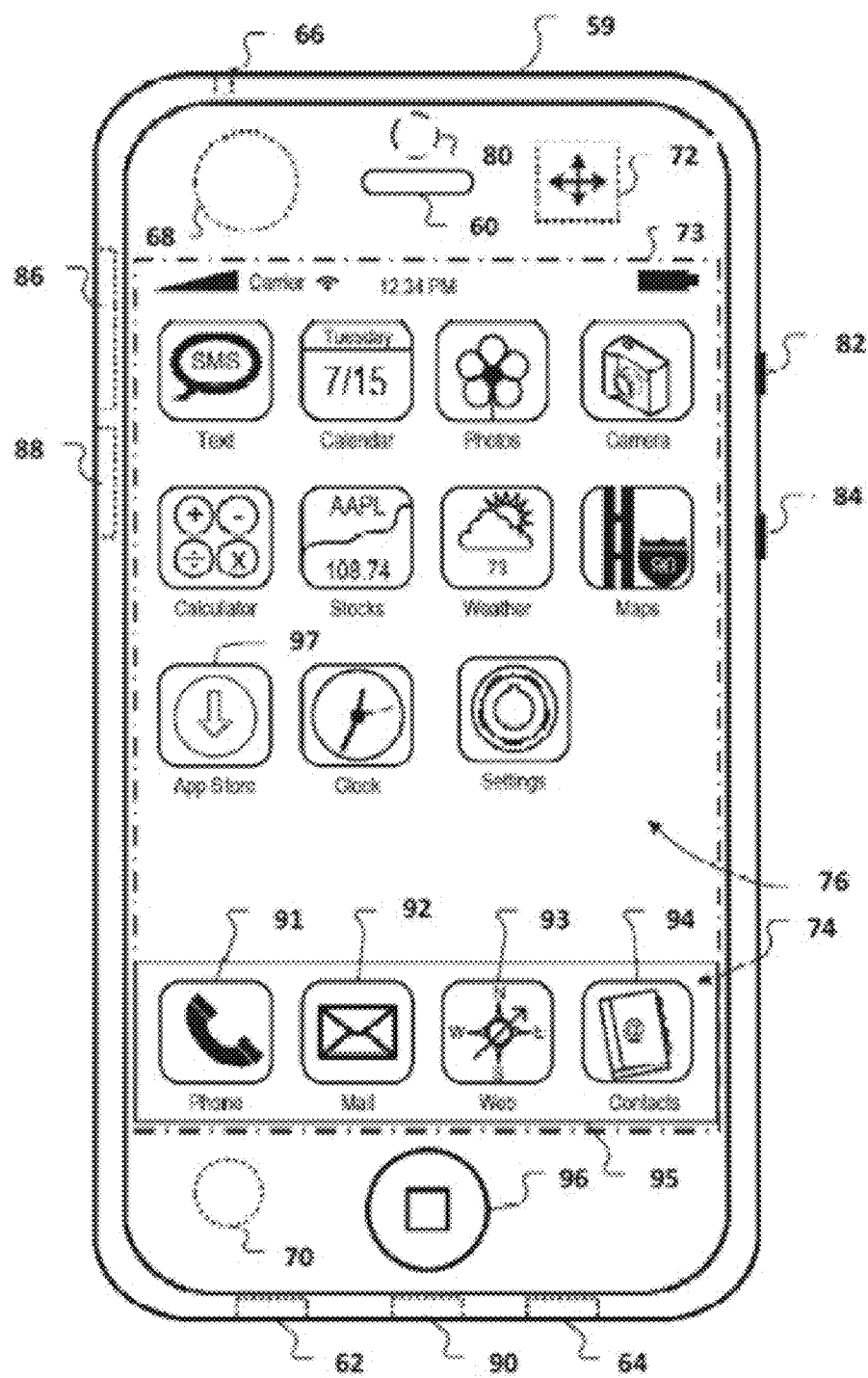
FIG. 6 is a block diagram of an exemplary mobile device that can be used according to an embodiment.

FIG. 6 is a block diagram of an exemplary mobile device 59, according to an embodiment. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94.

In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape.

In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 7:
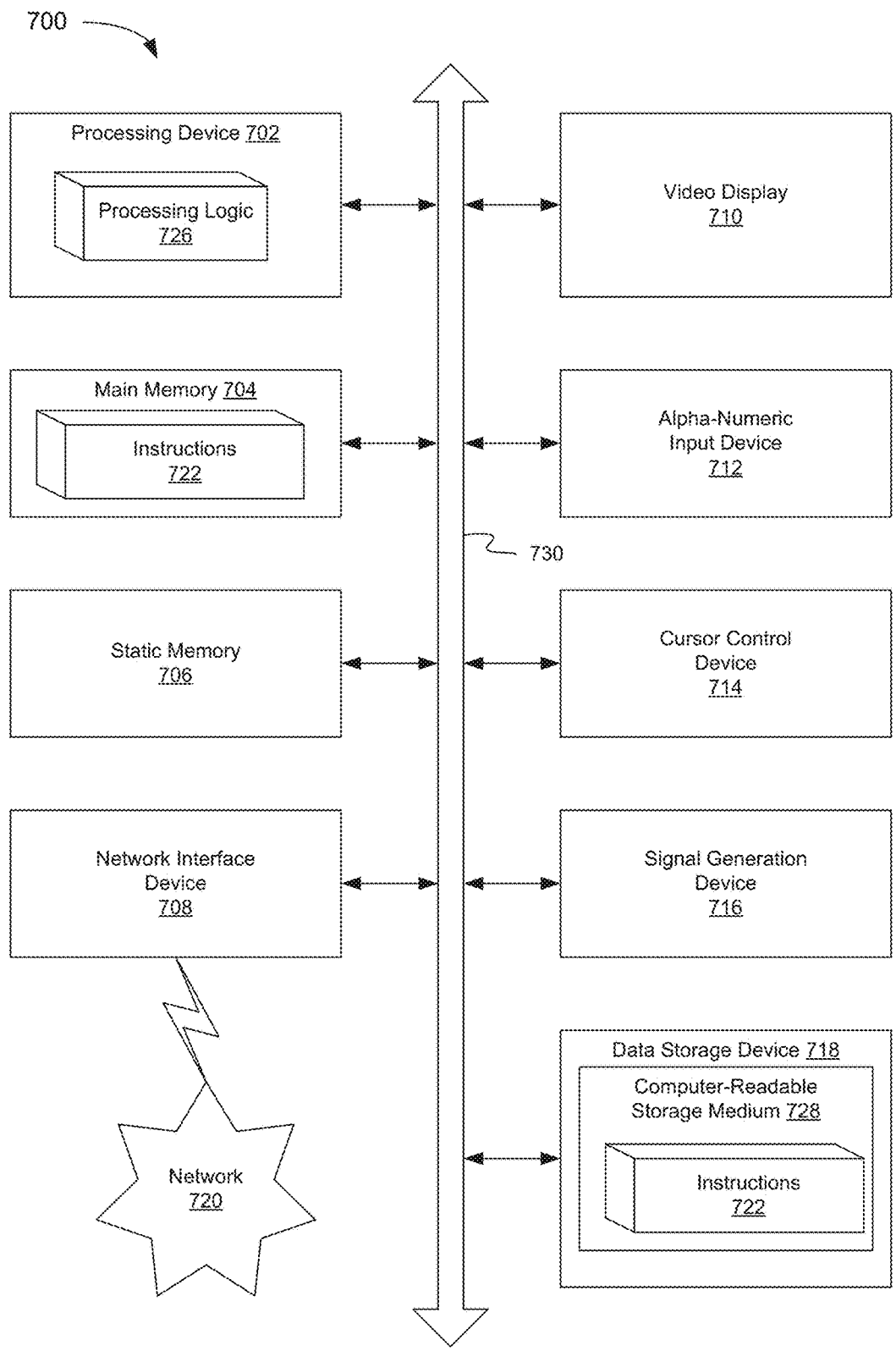
FIG. 7 is a block diagram illustrating an exemplary computer system on which embodiments of the present disclosure may be implemented.

FIG. 7 illustrates a diagrammatic representation of a machine in the exemplary form of a computer system 700 within which a set of instructions, for causing the machine to perform any one or more of the methodologies discussed herein, may be executed. For example, the instructions may cause the machine to perform conversion of remote application dialogs to native mobile controls. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent remote server 110 or mobile client device 120 of FIG. 1.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein. In one embodiment, processing logic 726 is representative of server control converter 112 and/or mobile control converter 122 of FIGS. 1, 2A and 2B.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of server control converter 112 or mobile control converter 122) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining", "maintaining", "analyzing", "receiving," "identifying," "determining," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a processing device of a remote server, pixel mapping data corresponding to an active application window, the active application window comprising a user interface in a first format generated by an application running on the remote server;

identifying, based on the pixel mapping data corresponding to the active application window, at least one control in the active application window and a plurality of control options associated with the at least one control;
generating a first metadata representation of the at least one control and of the plurality of control options; and
sending the first metadata representation to a mobile device communicatively coupled to the remote server, the mobile device to generate a user interface in a second format based on the first metadata representation to present the control and the plurality of control options on the mobile device.

2. The method of claim 1, further comprising:
receiving a command issued by the mobile device, the command requesting a launch of the application on the remote server; and
launching the application on the remote server.

3. The method of claim 1, further comprising:
detecting the active application window generated by the application running on the remote server.

4. The method of claim 1, further comprising:
receiving a second metadata representation of an input action from the mobile device, the input action comprising a selection of one of the plurality of control options;
converting the second metadata representation to the first format used by the application running on the remote server; and
executing a command corresponding to the input action in the application running on the remote server.

5. The method of claim 1, wherein identifying the at least one control and the plurality of control options comprises identifying a location of the control within the user interface in the first format and at least one parameter corresponding to the control.

6. The method of claim 1, wherein the first metadata representation comprises a tree structure representing a relationship between the at least one control, the plurality of control options and one or more additional controls and corresponding control options in the active application window.

7. The method of claim 1, wherein the mobile device to generate the user interface in the second format according to interface guidelines associated with a mobile operating system running on the mobile device.

8. A remote server computing system comprising:
a memory; and
a processing device operatively coupled to the memory, the processing device to:
identify pixel mapping data corresponding to an active application window, the active application window comprising a user interface in a first format generated by an application running on the remote server;
identify, based on the pixel mapping data corresponding to the active application window, at least one control in the active application window and a plurality of control options associated with the at least one control;
generate a first metadata representation of the at least one control and of the plurality of control options; and
send the first metadata representation to a mobile device communicatively coupled to the remote server, the mobile device to generate a user interface in a second format based on the first metadata representation to present the control and the plurality of control options on the mobile device.

9. The remote server computing system of claim 8, the processing device further to:
receive a command issued by the mobile device, the command requesting a launch of the application on the remote server; and
launch the application on the remote server.

10. The remote server computing system of claim 8, the processing device further to:
detect the active application window generated by the application running on the remote server.

11. The remote server computing system of claim 8, the processing device further to:
receive a second metadata representation of an input action from the mobile device, the input action comprising a selection of one of the plurality of control options;
convert the second metadata representation to the first format used by the application running on the remote server; and
execute a command corresponding to the input action in the application running on the remote server.

12. The remote server computing system of claim 8, wherein to identify the at least one control and the plurality of control options, the processing device to identify a location of the control within the user interface in the first format and at least one parameter corresponding to the control.

13. The remote server computing system of claim 8, wherein the first metadata representation comprises a tree structure representing a relationship between the at least one control, the plurality of control options and one or more additional controls and corresponding control options in the active application window.

14. The remote server computing system of claim 8, wherein the mobile device to generate the user interface in the second format according to interface guidelines associated with a mobile operating system running on the mobile device.

15. A non-transitory computer readable storage medium storing instructions that, when executed by a processing device of a mobile device, cause the processing device to:
receive, from a remote server communicatively coupled to the mobile device, a first metadata representation of at least one control in an active application window and of a plurality of control options associated with the at least one control, the at least one control and the plurality of control options identified based on pixel mapping data corresponding to the active application, wherein the active application window comprises a user interface in a first format generated by an application running on the remote server, and
generate, by the processing device of the mobile device, a user interface in a second format based on the first metadata representation to present the control and the plurality of control options on the mobile device.

16. The non-transitory computer readable storage medium of claim 15, wherein the instructions further cause the processing device to:
send a command to the remote server, the command requesting a launch of the application on the remote server.

17. The non-transitory computer readable storage medium of claim 15, wherein the instructions further cause the processing device to:

cause display of the user interface in the second format on the mobile device; and capture an input action corresponding to an interaction with the user interface, the input action comprising a selection of one of the plurality of control options.

18. The non-transitory computer readable storage medium of claim 17, wherein the instructions further cause the processing device to:

generate a second metadata representation of the input action; and send the second metadata representation to the remote server.

19. The non-transitory computer readable storage medium of claim 15, wherein the processing device to generate the user interface in the second format according to interface guidelines associated with a mobile operating system running on the mobile device.

20. The non-transitory computer readable storage medium of claim 15, wherein the first metadata representation comprises a tree structure representing a relationship between the at least one control, the plurality of control options and one or more additional controls and corresponding control options in the active application window.

* * * * *